United States Patent [19]

Van Dusseldorp

[11] 4,278,049

[45] Jul. 14, 1981

[54] ANIMAL FEEDER

[75] Inventor: Larry R. Van Dusseldorp, Britt, Iowa

[73] Assignee: Marting Mfg. Inc., Britt, Iowa

[21] Appl. No.: 148,787

[22] Filed: May 12, 1980

[51] Int. Cl.³ ............................................. A01K 5/00
[52] U.S. Cl. .................................................... 119/53.5
[58] Field of Search ................... 119/52 A, 53, 53.5, 119/54, 57

[56] References Cited

U.S. PATENT DOCUMENTS

| | | | |
|---|---|---|---|
| 1,044,172 | 11/1912 | Hamilton | 119/53.5 |
| 1,701,338 | 2/1929 | Rowles | 119/52 A |
| 1,719,245 | 7/1929 | Smidley | 119/53.5 |
| 1,881,820 | 10/1932 | McCollough et al. | 119/53.5 |
| 2,226,476 | 12/1940 | Maggart | 119/52 A |
| 2,522,635 | 9/1950 | Pittenger et al. | 119/54 |
| 2,966,135 | 12/1960 | Kelley et al. | 119/53.5 |
| 3,552,360 | 1/1971 | Nelson | 119/53.5 |
| 4,147,132 | 4/1979 | Gilst | 119/53 |

Primary Examiner—Gene Mancene
Assistant Examiner—Robert P. Swiatek
Attorney, Agent, or Firm—Wood, Herron & Evans

[57] ABSTRACT

An animal feeder is disclosed which comprises a feed trough and a hopper mounted above the trough for automatically feeding stored food into the feed trough as it is consumed by animals feeding therein. Flow of food from the hopper into the feed trough is controlled by an agitator or butt plate located within the trough and spaced a predetermined distance from the bottom of the trough. A wire grid extends from the butt plate upwardly into the hopper such that agitation or movement of the butt plate by animals feeding within the trough causes corresponding movement of the wire grid. To control the flow of food from the hopper into the trough, the butt plate is adjustable relative to the trough so as to vary the size of the opening through which the food must flow in order to become accessible to animals feeding in the trough. This adjustment is effected by a rotatable screw and nut feed which is controlled by a handle located in the open top of the hopper.

11 Claims, 3 Drawing Figures

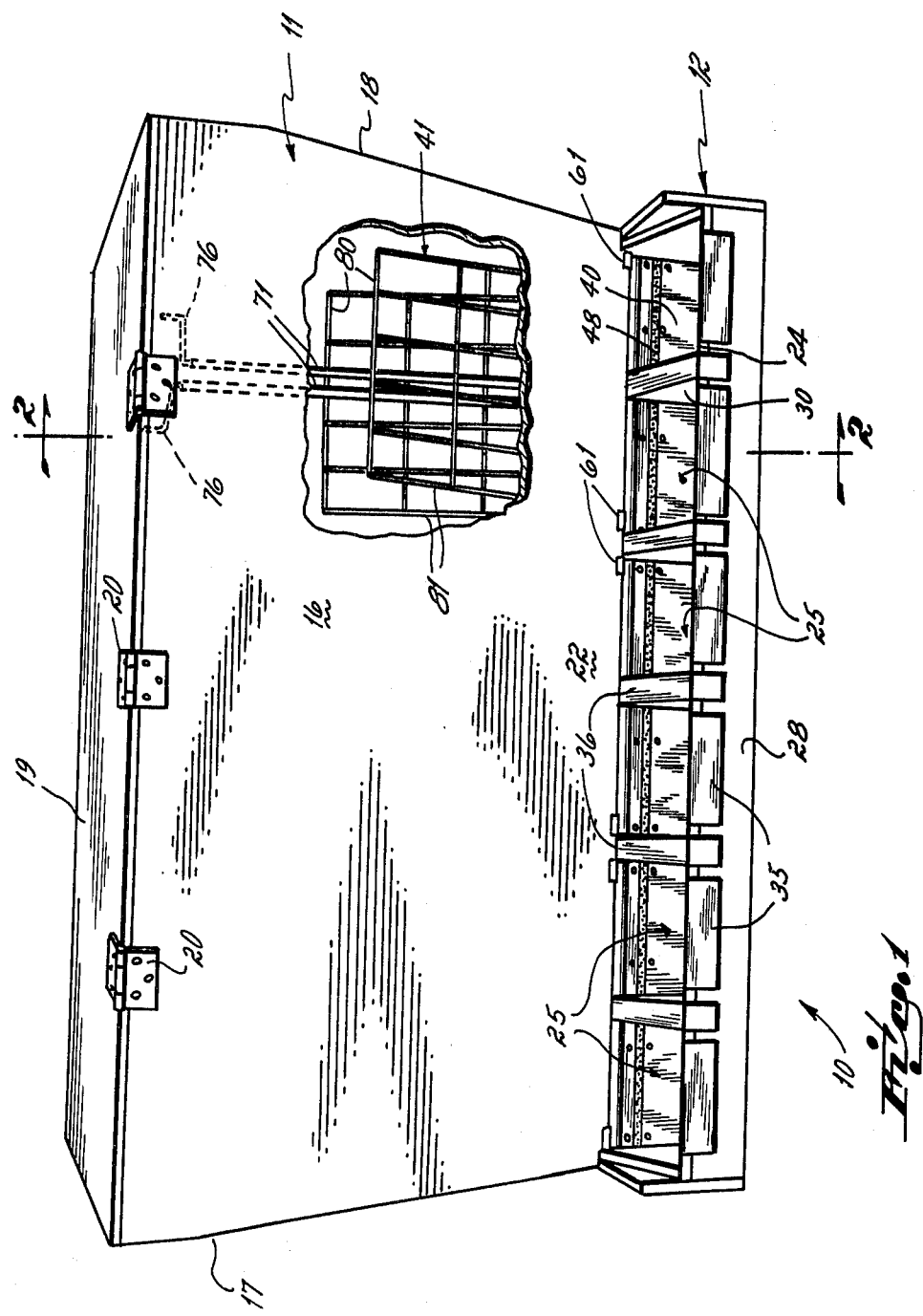

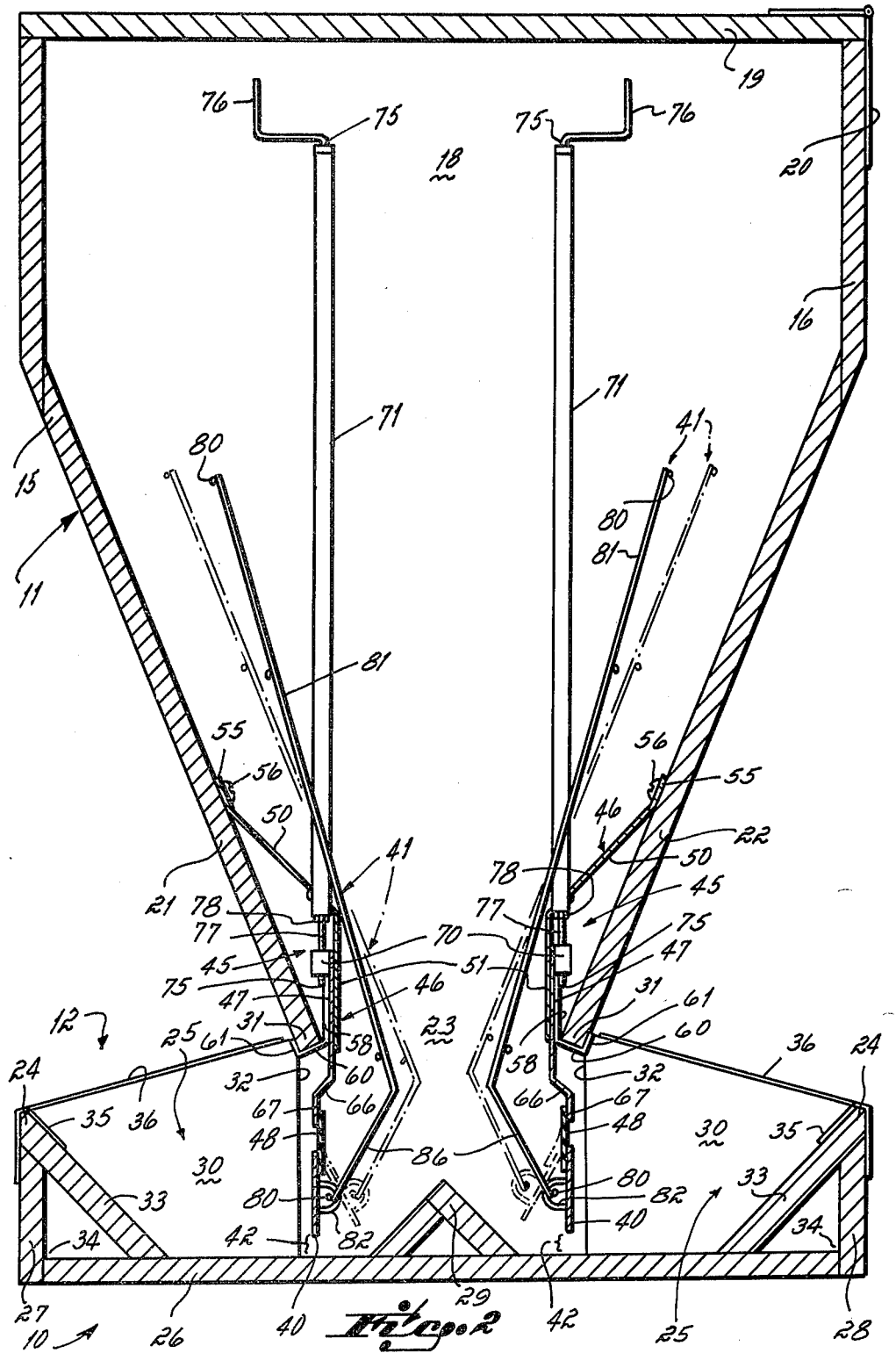

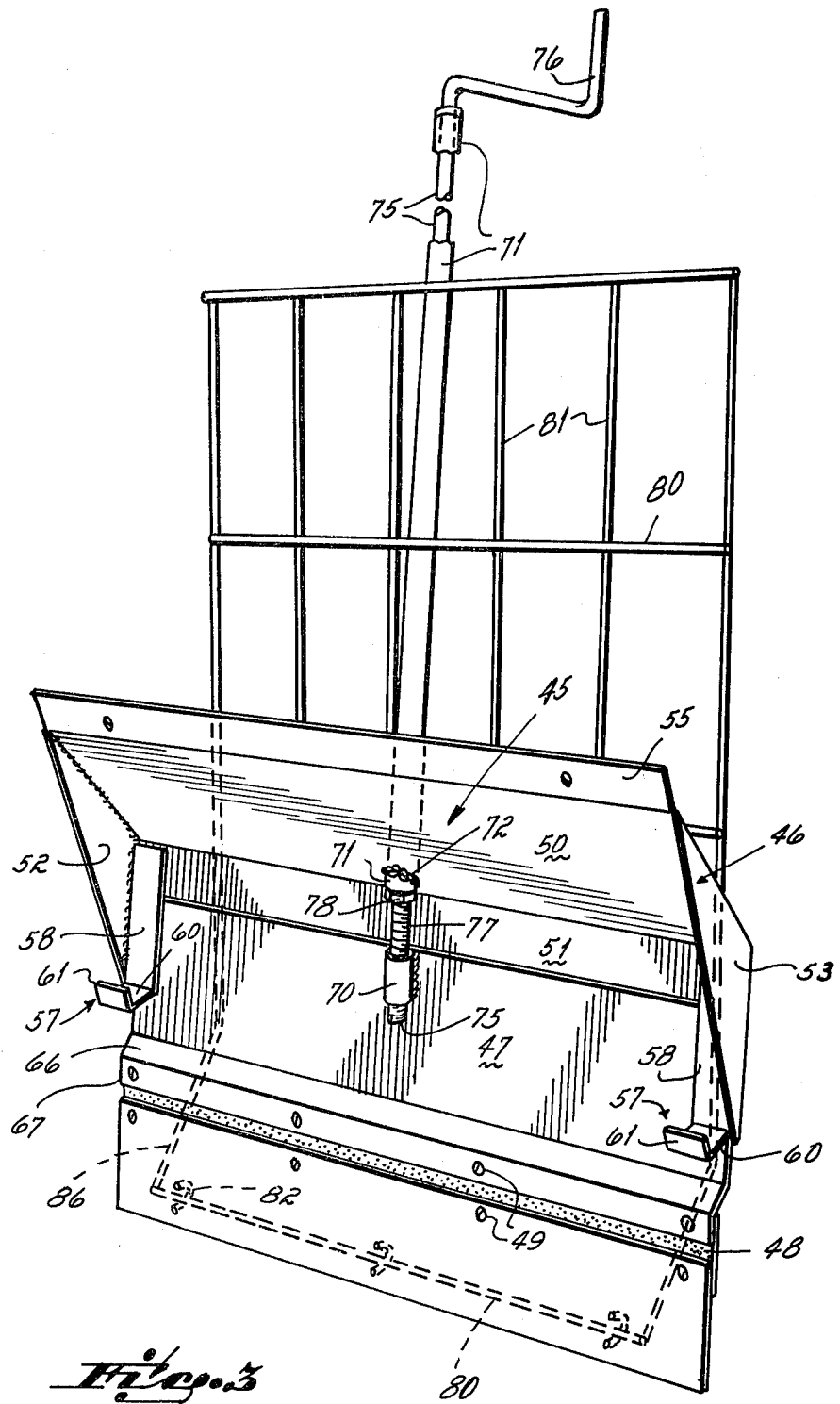

ANIMAL FEEDER

This invention relates to animal feeders, and more particularly to hopper style feeders.

Hopper style feeders commonly comprise a feed storage hopper mounted above a feed trough. Dry food materials stored in the hopper flow downwardly by gravity from the hopper into the feed trough. As the animals consume food from the trough, more food automatically flows into the trough to replace that which has been consumed.

One problem common to this style of feeder is that of the food within the hopper becoming packed such that "bridges" are formed in the feeder which prevent free flow of the food to the bottom trough. To combat these "bridges" and maintain a free flow of food through the feeder, agitating apparatus is commonly arranged within the feeder. One form of agitator comprises a wire grid extending into the hopper from the feed trough and connected at its lower end to a movable agitating plate or so-called butt plate. This butt plate is so positioned in the feed trough that an animal feeding within the trough contacts the butt plate with its nose, thereby agitating or moving the butt plate and its attached agitator grid. Movement of the grid then prevents the build-up of the "bridge" and breaks up any then existing bridge.

In order for food to flow from the hopper into the feed trough it must flow beneath the butt plate. Consequently, the spacing of the butt plate from the bottom of the trough controls the rate of flow from the hopper into the trough. To accommodate gravity flow of differing food materials and/or of food materials of differing granular size and under differing atmospheric conditions, this feed opening must be regularly adjusted to maintain optimal flow from the feeder. But, the adjustment of this opening has always been a problem or difficulty with such feeders. So far as I know, this adjustment of agitator style gravity flow feeders has always required that the adjustment be made at the trough; that is, by a workman kneeling and reaching into the feed trough to make the adjustment. Consequently, such feeders are not usually adjusted as frequently as would be desirable, and when they are adjusted, it is a time consuming matter. Examples of animal feeders which require such an adustment at the feeder trough level may be seen in U.S. Pat. No. 3,552,360 and U.S. Pat. No. 2,966,135.

It has been a primary objective of this invention to provide an agitator style of animal feeder in which the feeder opening may be more easily and quickly adjusted than in any now existing feeders.

It has been another objective of this invention to provide adjustment of the food opening of an agitator style of feed hopper which may be easily made by means of an adjustment mechanism accessible through the open top of the hopper.

According to the practice of this invention, this adjustment mechanism comprises a rotatable handle disposed at the top of the feeder which is so connected to the adjustable butt or agitator plate that rotation of the handle effects movement of the butt plate. The connection is such that the adjustment may be made independently of the amount of feed in the hopper and without the use of any tools.

In the preferred embodiment of the invention, the rotatable handle is connected to a slide plate mounted within an enclosure in the bottom of the hopper. The butt or agitator plate is suspended from this slide plate. A threaded connector is attached to the slide plate such that rotation of the handle effects rotation of a threaded portion of the rod within the threaded connector and thereby effects vertical movement of the slide plate and the attached butt plate.

The primary advantage of this invention resides in the fact that feed opening adjustments may be easily made from the top of the hopper without any special tools. Consequently, the feeder will be more frequently adjusted to accommodate all of the differing conditions to which such feeders are commonly exposed and will be maintained in a condition in which there is the free flow of food through the opening without excessive flow and without blockage of flow.

These and other objects and advantages of this invention will be more readily apparent from the following description of the drawings in which:

FIG. 1 is a perspective view of a feeder incorporating the invention of this application.

FIG. 2 is a cross-sectional view taken on line 2—2 of FIG. 1.

FIG. 3 is a perspective view of the feed agitator portion of the feeder and of the mechanism for adjusting that agitator.

Referring to FIGS. 1 and 2 it will be seen that the feeder 10 of this invention comprises a hopper 11 for receiving and storing dry, granular, or ground foods and for gravity feeding the foods into a feed trough 12 located beneath the hopper. The feeder is an automatic feeder in the sense that it automatically feeds stored food into the trough 12 as animals consume it.

The hopper 11 comprises side walls 15, 16, ends walls 17 and 18, and a cover 19 hingedly secured to one of the side walls 16. The hinges 20 which connect the cover to the side wall permit the cover or lid to be opened so that bags of feed may be dumped into the hopper, and the hopper thereafter closed to prevent moisture in the form of rain or snow from entering the hopper and contaminating the foods stored therein.

As may be seen more clearly in FIG. 2, the lower portions 21, 22 of the side walls 15, 16 of the hopper 11 taper inwardly to form a relatively narrow throat 23 through which feed must pass in the course of flowing into the trough 12. This inward taper of the side walls provides an a overhang of those walls over the feed trough 12. This overhang prevents the animals from standing in the trough while feeding and affords some protection of the food contained within the trough.

The feed trough 12 extends for the full length of the hopper 11. Its end walls 17 an 18 are common to the end walls of the hopper. In addition to the end walls 17 and 18, the trough comprises a bottom wall 26 and side walls 27, 28. There is a triangular shaped longitudinal divider 29 which extends for the full length of the trough. This divider functions to force gravity fed food outwardly to the sides of the trough and to prevent food from accumulating in the center thereof where it is not accessible to animals feeding within the trough.

The trough 12 is divided into individual feed bins 25 by transversely extending divider walls 30. These walls 30 extend from the side walls 27 inwardly to a point beneath the hopper. The inner edges 32 of these divider walls terminate at a point immediately beneath the inner edges 31 of the side walls 15 and 16.

Within each feed bin there is a sloping side wall 33 which extends at an angle of approximately 45°, between the top edge 24 of the side wall and the bottom wall 26. These sloping walls 33 prevent food from entering and accumulating in the corner 34 of the trough where it would otherwise be inaccessible to animals feeding in the feed bins 25.

In the preferred embodiment of the invention, the upper edges of the side walls 27, 28 and sloping walls 33 are covered by sheet metal covers 35 which are nailed or otherwise secured to the side and sloping walls 27, 28 and 33. Additionally, the tops of the transverse divider walls 30 have metal covers 36 nailed or otherwise secured thereto. The outer ends of these divider wall covers 36 extend downwardly and are nailed to the sides of the side walls 27, 28. These metal covers 35, 36 function to prevent animals feeding within the trough from eating or otherwise destroying the wooden boards or material of which the feeder is manufactured.

Located within the feed trough 12 there are a series of agitator or butt plates 40, one butt plate 40 being provided for each pair of side-by-side feed bins 25. Extending upwardly from the agitator plates are wire grids 41 which, as explained more fully hereinafter, function to agitate food contained within the hopper and prevent that food from forming a bridge across the throat 23 of the hopper and thereby blocking flow from the hopper into the feed trough.

In order to flow from the hopper 11 into feed bins 25 of the feed trough and thereby become accessible to the animal feeding in the trough 12, the food must flow beneath the agitator plates 40 through an opening or throat 42. The height of this opening 42 is adjustable so as to vary or control the rate of flow of food from the hoopper into the feed bins.

Referring now to FIG. 3, there is illustrated one agitator grid 41, and the mechanism 45 for effecting vertical adjustment of that agitator plate. Since the agitator plate 40 and adjustment mechanism 45 are all identical, only one is illustrated and described in detail herein. It should be appreciated though that a number of identical mechanisms are contained within each feeder and that each mechanism 45 and attached agitator plate is separately adjustable.

With reference to FIGS. 2 and 3 it will be seen that the agitator plate, as well as the mechanism 45 for supporting and adjusting that plate, is mounted on the bottom 31 of the side walls 15 and 16. This mechansim 45 comprises a housing 46 and a slide plate 47. The agitator or butt plate 40 is suspended from the slide plate 47 by means of rubber belting 48 which is connected to the bottom of the slide plate and top of the agitator plate by any conventional connector, as for example nuts and bolts 49.

The housing 46 comprises a top wall 50, rear wall 51, and a pair of end walls 52, 53 which together form an enclosure which is open on one side. The rear wall 51 of the housing is located in a vertical plane and has its lower edge in approximately the same horizontal plane as the bottom edge 31 of the side wall 15. The top wall 50 extends upwardly and outwardly from the top edge of the rear wall 51 and has its upper edge portion 55 secured to the side walls by means of wood screws 56. Extending inwardly from each of the end walls 52, 53 there is a mounting bracket 57. Each of the brackets 57 is welded to one of the end walls 52, 53 and each is generally L-shaped. A rear leg 58 of each bracket is located in a vertical plane spaced from the rear wall 51 of the housing by a distance slightly greater than the thickness of the slide plate 47. The gap between the vertical leg 58 of the bracket 57 and the rear wall 51 of the housing functions as a slideway or guideway for the slide plate 47 which extends into this gap. A lower leg 60 of each bracket 57 extends downwardly and outwardly from the bottom edge of the vertical leg 58 and has a lip 61 bent upwardly at an angle of approximately 90° to the lower leg 60 at its outer end. The agitator plate supporting and mounting mechansim 45 is attached to one of the side walls 15 and 16 by locating the lower edge 31 of the side walls into the hook formed at the lower end of the brackets 57 and then attaching the upper edge 55 of the housing to the inside of the side walls by means of the wood screws 56.

With reference to FIG. 2 it will be seen that when the enclosure formed by the rear wall 51, top wall 50, and end walls 52, 53 of the housing is mounted upon the side wall of the hopper, it forms a closed chamber. That chamber is open only along the bottom edge between the rear wall 51 of the housing and the rear inside edge of the side walls 15, 16. That slight opening though is closed by the slide plate 47, the ends of which are movable within the slideway formed between the bracket 57 and the rear wall 51.

It will be seen that the upper end section of the slide plate 47 is generally planar and that there is a downwardly and outwardly angled section 66 at the bottom of the planar upper section. This angled section 66 terminates in a vertical section 67. The rubber or resilient belting 48, by means of which the agitator plate 40 is suspended from the slide plate, is attached to the lower vertical section 67 of the slide plate. The purpose of the angled section 66 is to space the agitator or butt plate 40 outwardly beneath the bottom edge 31 of the side walls where the butt plate is more easily engaged by animals feeding within the feed bins 30.

Fixedly attached to the upper end of the slide plate 47 within the closed chamber there is a threaded sleeve 70. In the preferred embodiment, this sleeve is welded to the upper end of the slide plate.

A hollow pipe or tube 71 extends from the top of the hopper downwardly through the top wall 50 of the housing 46. This tube is preferably welded to the top wall 50 of the housing as indicated at 72 in FIG. 3. A rotatable rod 75 extends between and from the opposite ends of this tube 71. This rod 75 has a crank or handle 76 formed in its upper end and is threaded as indicated at 77 on its lower end. The lower threaded end is threaded into the threaded sleeve 70 of the slide plate such that rotation of the rod effects vertical movement of the slide plate 47.

To prevent movement of the rod 75 within the tube 71, a lock nut 78 is threaded onto the threaded end section 77 of the rod. This lock nut 78, once threaded onto the rod, rotates with the rod and prevents the rod and handle from moving upwardly within the tube 71.

Again with reference to FIGS. 2 and 3 it will be seen that the wire grid agitator 41 comprises a series of spaced horizontal wires 80 welded to a series of spaced vertical wires 81. The lowermost horizontal wire 80 extends through semi-circular loops 82 welded or otherwise secured to the agitator plate 40 such that the wire grid is pivotally secured to the rear of the agitator plate by the semi-circular loops. From the attachment point of the grid to the agitator plate the wire grid has a lower section 86 which extends upwardly and inwardly from the point of attachment to the agitator plate and is bent near the point at which it passes through the throat 23 of the hopper. From the bend, the grid extends outwardly generally parallel to the lower sections 21, 22 of the side walls.

In operation, bags of feed are dumped into the hopper 11 of the feeder so as to provide a large reservoir of feed within the hopper. That feed flows downwardly through the throat 23 of the hopper and outwardly through the feed opening 42 beneath the agitator plate 40 and into the feed bins 25 of the feed trough 12. As animals feed upon the food contained within the feed bins, additional food flows downwardly through the hopper and into those bins, so that the bins remain automatically supplied with food. As the animals feed within the feed bin, their noses bump against the agitator plates 40 causing the plates to move from the solid line position of FIG. 2 to the phantom line position. This movement results in movement of the wire grids 41, which movement breaks up any bridges or impediments to free flow of feed through the hopper throat 23 downwardly into the feed trough. In the absence of the grid those bridges or impediments would block the flow of food at the throat and thereby prevent continued automatic feed from the hopper into the feed trough.

In the event that the flow of food from the hopper into the feed bins is insufficient, or in the event that the size of the food particles contained within the hopper is changed, it may be necessary to raise the agitator plate 40 and increase the size of the opening 42 beneath the agitator plate. In that event, the handle or crank 76 of the rod 75 is rotated so as to thread the lower end of the rod into the threaded sleeve 70. This has the effect of causing the slide plate to raise upwardly, thereby moving with it the agitator plate 40 which is suspended from the slide plate. Thus, the feed opening 42 is increased in height. Alternatively, if the feed opening is to be decreased, the handle is rotated in the opposite direction, thereby unthreading the adjustment rod 75 from the threaded sleeve 70 and causing the slide plate 47 to move downwardly relative to the housing and the hopper to which the housing is attached. This results in the agitator plate being lowered, thereby decreasing the height of the feed opening or throat 42 through which the food must pass in the course of moving from the hopper into the feed bin 30.

The primary advantage of this invention resides in the ease with which the size of the feed opening 42 between the agitator plate and the bottom wall of the feed trough may be varied to increase or decrease the flow of food through that opening into the feed trough. All that is required is for the workman to open the lid of the feed hopper and rotate the handle 76. The workman need not ever get onto his hands and knees and reach into the feed trough as has heretofore been the practice and he needs no tools to make the adjustment.

While I have described only a single preferred embodiment of my invention, persons skilled in this art will appreciate changes and modifications which may be made without departing from the spirit of my invention. Therefore, I do not intend to be limited except by the scope of the following claims:

I claim;

1. An animal feeder comprising,
   a feed hopper having side walls, end walls, a bottom assembly, and an open top,
   a movable closure operable to close said open top of said feed hopper,
   metering means positioned to extend below the lower edge of at least one of said side walls,
   said bottom assembly including a feed trough under said metering means and in communication with said feed hopper,
   said metering means including a slide plate housing, a slide plate, and an agitator plate,
   said slide plate housing having a plurality of interconnected walls closed except on one side, said one side being mounted against the inside surface of one of said hopper side walls so as to form a closed enclosure within said housing,
   said slide plate being supported by said housing for vertical movement relative thereto, said slide plate having its upper end extending into said enclosure of said housing and its lower end extending from said housing,
   said agitator plate being pivotally suspended from said slide plate, and
   adjustment means for effecting vertical adjustment of said slide plate relative to said housing, said adjustment means including a rod extending through one of said housing walls and into said housing enclosure, said rod being secured adjacent its lower end to said slide plate and having the opposite end accessible through the open top of said feed hopper such that movement of said opposite end of said element effects vertical adjustment of said slide plate and of the depending agitator plate.

2. The animal feeder of claim 1 in which said plurality of housing walls includes a top wall and an inside wall, said top wall being secured to the inside surface of said hopper side wall and said inside wall having its lower end terminating adjacent the lower edge of said hopper side wall so as to define a slot therebetween, and said slide plate extending through said slot between said lower edge of said housing inside wall and the lower edge of said hopper side wall.

3. The animal feeder of claim 2 in which said plurality of housing walls includes a pair of housing end walls, said housing end walls having housing mounting brackets secured thereto, said housing mounting brackets being spaced from said inside wall of said housing so as to define therebetween a slideway, and said slide plate being movably mounted within said slideway.

4. The animal feeder of claim 1 which further includes a wire grid attached to the agitator plate so as to be movable with the agitator plate, said wire grid being located on the inward side of the agitator plate and extending into the feed hopper such that movement of said agitator plate and attached wire grid prevents compacting of feed on the bottom of said hopper.

5. The animal feeder of claim 1 in which the side walls of said feed hopper slope downwardly and inwardly.

6. The animal feeder of claim 1 in which said adjustment means comprises a non-rotatable sleeve secured to said slide plate housing, said rod means extending through said sleeve and having a rotatable handle at the upper end projecting from the sleeve and a threaded section at the lower end, said slide plate having a threaded bore located within said housing enclosure, and said threaded section of said rod being threaded into said threaded bore of said slide plate such that rotation of said rod effects vertical movement of said slide plate.

7. An animal feeder comprising,
   a feed hopper having side walls, end walls, a bottom assembly, and an open top, a movable closure operable to close said open top of said feed hopper, metering means positioned to extend below the lower edge of at least one of said side walls, said bottom assembly including a feed trough under said metering means and in communication with said feed hopper, said metering means including a slide plate housing, a slide plate, and an agitator plate, said slide plate housing being mounted on the inside surface of said side wall, said slide plate being supported by said housing for vertical movement relative thereto.

said agitator plate being movably suspended from said slide plate, and adjustment means for effecting vertical adjustment of said slide plate relative to said housing, said adjustment means including a rod secured adjacent one end to said slide plate and having the opposite end accessible through the open top of said feed hopper such that movement of said opposite end of said element effects vertical adjustment of said slide plate and of the depending agitator plate.

8. The animal feeder of claim 7 which further includes a wire grid attached to the agitator plate so as to be movable with the agitator plate, said wire grid being located on the inward side of the agitator plate and extending into the feed hopper such that movement of said agitator plate and attached wire grid prevents compacting of feed on the bottom of said hopper.

9. The animal feeder of claim 7 in which the side walls of said feed hopper slope downwardly and inwardly.

10. The animal feeder of claim 7 in which said adjustment means comprises a non-rotatable sleeve secured to said slide plate housing, said rod extending through said sleeve and having a rotatable handle at the upper end projecting from the sleeve and a threaded section at the lower end, said threaded section of said rod being threaded into a threaded bore of said slide plate such that rotation of said rod effects vertical movement of said slide plate.

11. The animal feeder of claim 7 in which said agitator plate is suspended from said slide plate by at least one strip of rubber belting.

* * * * *